United States Patent

[11] 3,611,126

[72] Inventor Eugene R. Lucka
 Columbus, Ohio
[21] Appl. No. 827,561
[22] Filed May 26, 1969
[45] Patented Oct. 5, 1971
[73] Assignee Reliance Electric Company
 Columbus, Ohio

[54] SERVO CENTERED NONCONTACT THICKNESS MEASURING GAUGE
17 Claims, 3 Drawing Figs.

[52] U.S. Cl. .................................................... 324/61 R
[51] Int. Cl. ...................................................... G01n 27/26
[50] Field of Search ............................................ 324/34, 61; 73/67.4

[56] References Cited
UNITED STATES PATENTS
3,452,273 6/1969 Foster .......................... 324/61

Primary Examiner—Edward E. Kubasiewicz
Attorney—LeBlanc & Shur

ABSTRACT: Disclosed is a noncontacting gauge for measuring material thickness. The gauge comprises a pair of opposed capacitive probes mounted on a common support and vibrated at a constant amplitude and frequency. The probe responses produce a double frequency output whose amplitude is indicative of the thickness of material between the probes. A feedback signal to the probe shaker maintains the material being measured midway between the two probes.

INVENTOR
EUGENE R. LUCKA

BY
Le Blanc & Shur
ATTORNEYS

SERVO CENTERED NONCONTACT THICKNESS MEASURING GAUGE

This invention relates to a noncontacting gauge for measuring the thickness of materials and more particularly is directed to a servo centered differential gauge which makes it possible to accurately determine the thickness of extremely small parts.

At the present time the thickness of materials is determined in a variety of ways. One system utilizes a differential probe technique where two probes are positioned on opposite sides of the material whose thickness is to be determined. An advantage of this system is that the material can be measured independent of the position between the probes and the probes can be of either the contact or the noncontact type. Noncontact probes suitable for use in differential thickness measuring may utilize capacitive effects, inductive proximity, or the probes may be even of the optical or eddy current sensing types.

In previously proposed differential thickness gauges the response curves of both pickups must be essentially identical and the analog outputs after signal conditioning should be linear and of equal slope. The reason for this equality requirement is that the difference in output of both analog outputs is taken to determine thickness. Another requirement is the necessity of reading thickness independent of material position between the probes so that the outputs of the transducers connected to each of the probes must be in opposing relationship. In this case the difference output remains the same for any position between the probes throughout the linear range. The requirements of prior differential systems may be summarized as accuracy of linearity, a linear range, identical analog sensitivity to standoff slope throughout the linear range for both probes, differential summation stability, and constant spacing between the probes.

The present invention provides an improved thickness measuring gauge of the same general type but one which eliminates many of the stringent requirements of previous differential gauge constructions. In the gauge of this invention the probes are mounted on a conductive fork so as to oppose each other and yet be formed as an integral, single part. The fork is provided with an integral stem connected to a DC current magnetic shaker which provides both a constant shake and a variable low frequency centering motion. The constant shake produces an error signal which is applied through a servo loop to the magnetic shaker so as to modify the position of the probes to maintain the material being measured in a centered position between probes. A frequency modulation transducer senses movements of the probes in relation to the material between them and develops an output at twice the shake frequency whose magnitude is indicative of material thickness.

The servo centered differential gauge makes it possible to gauge very small parts for thicknesses down to accuracies of 0.000050 inch. The cost of performing this measurement is considerably reduced because fixturing requirements are relaxed by as much as 50 percent of standoff. In addition, the long time thickness gauging stability capability is significantly increased over known constructions. The gauge is suitable for use in continuous strip thickness gauging and probe sizes can be readily changed for different nominal thicknesses.

Therefore one object of the present invention is to provide an improved thickness measuring gauge.

Another object of the present invention is to provide a differential thickness gauge incorporating a servosystem for positioning a pair of differential probes such that the material to be measured is centered between the probes.

Another object of the present invention is to provide a noncontacting differential thickness measuring gauge incorporating a unitary double probe mounting.

Another object of the present invention is to provide a noncontacting servo centered differential thickness gauge in which very small parts can be gauged with improved accuracy and reliability.

Another object of the present invention is to provide an improved and simplified electronic thickness measuring gauge utilizing a pair of capacitive probes which are vibrated at a constant frequency and amplitude by a shaker system and incorporating a feedback or servo loop for effectively centering the material to be gauged between the probes.

These and further objects and advantages of the invention will be more apparent upon reference to the following specification, claims, and appended drawings wherein:

Figure 1:
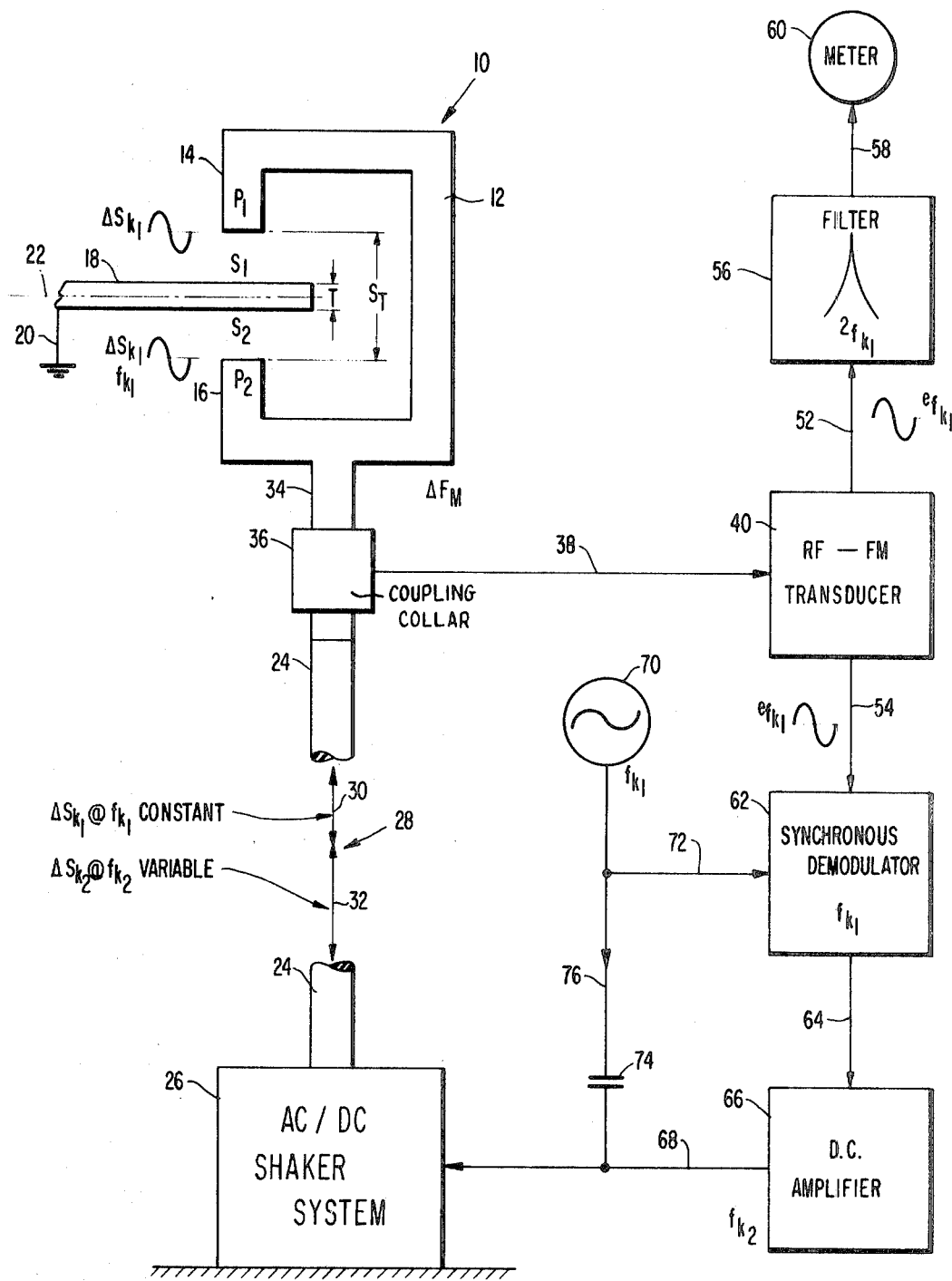
FIG. 1 is an overall block diagram of the novel servo centered differential thickness gauge constructed in accordance with the present invention.

Referring to the drawings the thickness gauge of this invention is generally indicated at 10 in FIG. 1 and comprises a generally C-shaped frame 12, the ends of which form a pair of spaced by opposing capacitive probes 14 and 16 labeled $P_1$ and $P_2$ respectively. Positioned between the probes is a flat strip of metal or other material 18, the thickness of which is to be measured by the gauge 10. Material 18 may be electrically grounded as indicated at 20, and is shown as spaced an equal amount on opposite sides of center line 22 which centerline is also midway between probes 14 and 16 so that the material to be measured is centered between the probes.

Conductive frame 12 is mounted on an electrically insulating shaft 24 shown broken away in FIG. 1 to illustrate the motion of the shaft and probes and this shaft is in turn coupled to an AC/DC shaker system generally indicated at 26. Shaker 26 is preferably of the type more fully disclosed in may copending application Ser. No. 758,428, filed Sept. 9, 1968, the disclosure of which is incorporated herein by reference. Briefly, shaker 26 comprises an electrical solenoid with a movable center armature and stationary magnet field structure. The armature is mounted on a restraining spring such that when the armature coil is energized, the armature moves against the restraint of the spring. The result is that the armature and shaft 24 to which it is mechanically connected move longitudinally of the shaft as indicated by the double ended arrows at 28 in FIG. 1 in accordance with the electrical current flow through the solenoid coil of the shaker. In the gauge of FIG. 1, the shaft 24 and hence probes 14 and 16 are subjected to a shake or vibration in the form of a sine wave having a constant magnitude $\Delta S_{K1}$ and a constant frequency $f_{K1}$. Superimposed upon this shake or vibration is a second motion in the form of an error or correction signal indicated by the magnitude $\Delta S_{K2}$ and the frequency $f_{K2}$. By way of example only, the constant shake $\Delta S_{K1}$ may have an amplitude of 0.01 inch peak-to-peak at a frequency $f_{K1}$ of 120 Hz. The $\Delta S_{K2}, f_{K2}$ component of the probe motion is not a periodic oscillation but rather a correction motion resulting from the servo feedback or error signal and is used to correct the position of the probes in a manner more fully described below so as to maintain the material 18 centered between probes 14 and 16. The constant periodic motion or vibration is indicated by the arrow 30 and the centering motion of the shaft and probe is indicated by the arrow 32 in FIG. 1.

Conductive frame 12 includes a conductive stem 34 forming the center conductor of a coaxial capacitive pickoff in conjunction with the surrounding but spaced outer conductor or collar 36. This pickoff is more fully shown and described in my copending application Ser. No. 758,428 filed Sept. 9, 1968 and forms a substantially fixed capacitive connection to the probes 14 and 16. That is collar 36 is stationary and is of annular configuration such that it surrounds but is spaced from conductive stem 34 on all sides so that irrespective of the vibrating movement of stem 34 within collar 36 the capacitance between these two elements is substantially constant due to the coaxial configuration. Collar 36 is connected by lead 38 to an RF–FM transducer 40.

Figure 2:
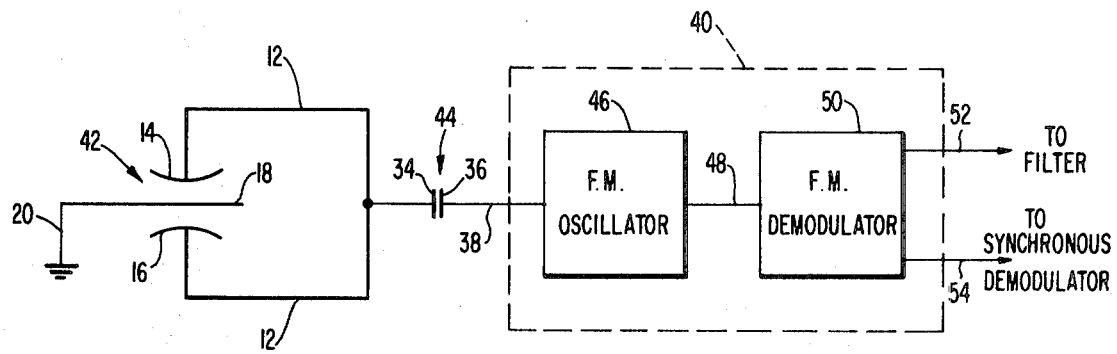
FIG. 2 is a block diagram showing the equivalent circuit for the probe structure and the transducer incorporated in the gauge of FIG. 1.

FIG. 2 shows the probe, pickoff, and transducer 40 of FIG. 1 and like parts bear like reference numerals. Probes 14 and 16 form the movable capacitor plates of a differential capacitor generally indicated at 32 having a fixed center plate 18 formed by the material to be measured. Movable plates 14 and 16 are connected through conductive frame 12 in parallel to stem 34 which forms one plate of a coupling capacitor indicated at 44 the other plate of which is formed by the collar 36. Coupling capacitor 44 as previously mentioned is substantially constant due to the coaxial configuration of the pickoff and the collar 36 is connected by lead 38 to an FM oscillator 46 forming part of the transducer 40 of FIG. 1. Oscillator 46 is of conventional construction and is a variable frequency oscillator having differential capacitor 42 connected in its frequency-determining circuit such that the output frequency of the oscillator varies in accordance with the movement of capacitor plates 14 and 16. The output of FM oscillator 46 is supplied by lead 48 to an FM demodulator 50 forming the other component of the transducer 40 of FIG. 1 which demodulator recovers the modulation signal on the output of the oscillator. The output of the demodulator is supplied to a filter and synchronous demodulator of FIG. 1 by way of leads 52 and 54.

Referring to FIG. 1 the output signal $ef_{K2}$ from the transducer 40 on lead 52 is supplied to a band pass filter 56 having a pass band as illustrated peaking at a frequency $2f_{K1}$, i.e., a frequency double that of constant shake $f_{K1}$. Filter 56 filters out other frequency components such as those having the frequency $f_{K1}$ of the constant shake and the frequency $f_{K2}$ of the feedback signal. The output from filter 56 is supplied by way of lead 58 to a meter 60 which meter gives a reading indicative of the thickness of material 18.

A signal $ef_{K1}$ is also supplied from transducer 40 in FIG. 1 by way of lead 54 to a synchronous demodulator or detector 62 which supplies a DC or slowly varying AC signal at its output by way of lead 64 to a direct coupled amplifier 66. The output signal from synchronous demodulator 62 is the $\Delta S_{K2}$ signal previously mentioned having frequency components $f_{K2}$ and constitutes a servo error or feedback signal for imparting the motion 32 to the probes so as to effect the centering of the material 18 between probes 14 and 16. This signal is amplified in amplifier 66 and applied by way of lead 68 to shaker 26 and more specifically to the solenoid coil of the shaker. An AC signal source or reference source 70 supplies a signal from its output by way of lead 72 to the synchronous demodulator 62 which signal acts as a reference signal for the demodulator. Source 70 also provides this output signal having a frequency $f_{K1}$ and a magnitude of $\Delta S_{K1}$ through a coupling capacitor 74 by way of lead 76 to the coil of shaker 26 to impart the motion 30 to the probes 14 and 16.

Figure 3:
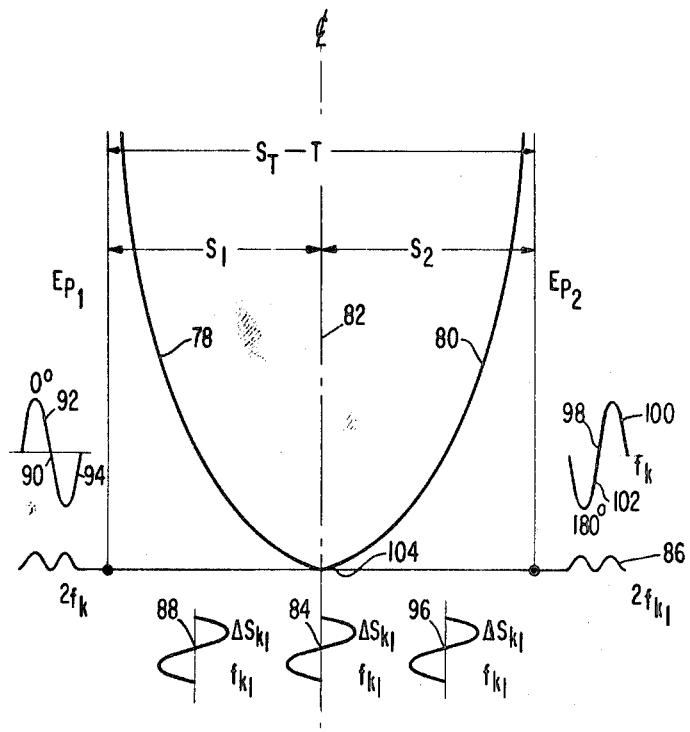
FIG. 3 is a plot of the probe response curves illustrating the generation of a double frequency output signal for an infinitely thin piece to be measured.

FIG. 3 is a plot of the response curves for the probes $P_1$ and $P_2$, i.e., probes 14 and 16. Curve 78 is a plot of voltage as a function of distance and more particularly is a plot of the voltage $E_{P1}$ from probe 14 as a function of the standoff distance $S_1$. This standoff distance is the distance from the upper surface of material 18 to the adjacent surface of probe 14. Similarly curve 80 is a plot of voltage as a function of distance and more particularly as a plot of the voltage $E_{P2}$ produced by probe 16 as a function of the standoff distance $S_2$, i.e., the distance from the lower surface of material 18 to the adjacent surface of probe 16. Curves 78 and 80 are mirror images of each other about the center line 82.

As illustrated in FIG. 3, a shake signal 84 about center line 82 having a magnitude $\Delta S_{K1}$ and frequency $f_{K1}$ produces an output signal to meter 60 having a double frequency, i.e., a frequency of $2f_{K1}$ as indicated at 86. A shake signal 88 which is off center toward probe 14, i.e., with probe $P_1$ closer to the work piece, produces an $f_{K1}$ signal output component 90 having a larger positive going half cycle 92 and a smaller negative going half cycle 94. A shake signal $\Delta S_{K1}$ indicated at 96 which is off center such that the work piece is closer to probe 16 ($P_2$) produces an $f_{K1}$ output signal 98 having the larger positive going half cycle 100 and the smaller negative going half cycle 102. It should be noted that there is a phase reversal from one side of the center line 82 to the other such that the curve 98 is 180 degrees out of phase with the output signal curve at 90.

In operation, the material 18 having a thickness T to be measured for thickness is inserted between probes $P_1$ and $P_2$. These probes shake in exact synchronism with each other at a frequency $f_{K1}$ and with a magnitude $\Delta S_{K1}$, both the magnitude and the frequency being constant. A typical value for $\Delta S_{K1}$ is 0.001 inch peak-to-peak and a typical frequency $f_{K1}$ is 120 Hz. The distance $S_T$ between probes 14 and 16 always remains constant because the probes are formed as integral parts with the frame 12. Typical values for probe dimensions are approximately 0.200 square inch for each of the probe surfaces. The probes can be round, square, or of any geometry, but must be equal. The response curves 78 and 80 of FIG. 3 represent the two response curves obtained by probes 14 and 16 due to changes in the respective standoff distances $S_1$ and $S_2$. The response curves cross over at the center point 104 between the probes along centerline 82. If it is assumed that the thickness T of the material approaches zero so that $S_T$ approximately equals $S_1$ plus $S_2$ when the material is exactly at center so that $S_1$ equals $S_2$, then the frequency output signal produced by motion $\Delta S_{K1}$ as indicated at 84 is that illustrated at 86 and equals twice the frequency of $2f_{K1}$. Any position other than at center as indicated by the shake curves 88 and 96 produces the outputs 90 and 98, i.e., a rapid reduction in the double frequency component until it completely disappears as represented by these latter two curves. Each side of the center position produces a 180 degree phase reversal for the $f_{K1}$ component.

The $2f_{K1}$ component amplitude varies with the slope of the response curve 78 and 80 at cross over point 104. The slope at crossover (center position of the workpiece 18) changes with the standoff distances $S_1$ and $S_2$. And as can be seen $S_1$ and $S_2$ at center can only change if the thickness changes since the probe distance $S_T$ always remains constant. Then the amplitude of the double frequency signal at center varies with thickness. The response curve for the double frequency signal ($2f_{K1}$) is nonlinear. The filter 56 provides rejection of any $f_{K1}$ or $f_{K2}$ components. At center the frequency $f_{K1}$ is theoretically zero but in practice this does not exist and for this reason filter 56 is provided.

Thickness measurements can be made only if the standoff distances $S_1$ and $S_2$ are equal. If work piece 18 is inserted between the probes $P_T$ and $P_2$ off center, then a large $f_{K1}$ component appears at the output of transducer 40. The $2f_{K1}$ component attenuates as rapidly as the $f_{K1}$ component increases. It is therefore necessary that the center position for the work piece be constantly maintained. A phase reversal for the $f_{K1}$ component occurs for each side of the centerline 82 of FIG. 1. This fact provides a natural steering function and synchronous demodulator 62 is used to convert the phase reversing of $f_{K1}$ into a polarity reversing DC or slowly varying AC voltage. The reference drive to the synchronous demodulator is the $f_{K1}$ signal from source 70. The synchronous demodulator is a phase sensitive detection system and has excellent even harmonic attenuation. Because of this the $2f_{K1}$ component at center position is canceled out at the output of the synchronous demodulator 62.

The DC polarity and the amplitude from the demodulator changes with the position of the work piece 18. The correct feedback voltage sense through the DC amplifier 66 to the shaker 26 produces a physical motion in the same direction as the offset center of the workpiece. This feedback motion indicated at 32 continues until centering results. When the workpiece is centered the feedback current to the magnetic shaker coil approaches zero. Off center correction is adjustable by means of the feedback loop again. A loop gain correction of 100 to 1 can be obtained before over correction instability results. Off center correction range of 100 percent of standoff $S_1$ or $S_2$ is obtainable but 50 percent is preferred to prevent the material from striking the probe before correction due to response limits. The frequency $f_{K2}$ is the off center correction response rate and normally ranges from zero to 10 Hz. Higher correction frequencies can be obtained if desired.

The correction signal or $\Delta S_{K2}$ component is not a periodic oscillation but a motion that varies with the material 18 entrance trajectory into the fork between probes $P_1$ and $P_2$. If the material 18 is centered between the probes in a position $C_l$, the DC current through the coil approaches zero. In this case the standoff distances $S_1$ and $S_2$ are equal and the synchronous demodulator output is zero because the $f_{K1}$ component is zero. A $2f_1$ component exists due to the presence of the material.

If now the material 18 is taken out and reinserted but not on the center line $C_L$, as soon as its end comes in close proximity to $P_1$ or $P_2$ and $f_{K1}$ component is generated with a corresponding $E_{DC}$ output of corresponding voltage amplitude and polarity in the $f_{K1}$ channel. The coil of the shaker now has a feedback signal resulting in a lifting or lowering ($\Delta S_{K2}$) of the two probes and automatically aligning $S_1$ and $S_2$ in position about the new center line. The present maximum response for the motion to correct centering is about 10 Hz. or 100 to 200 milliseconds.

The prime considerations for a symmetrical $2f_{K1}$ double frequency output at the centerline is that the probe areas be identical regardless of basic probe geometry. The probe geometry should be the same for each of the probes. The slope of the response curves 78 and 80 should be mirror images of each other and the constant $\Delta S_{K1}$ motion should be symmetrical. In other words, the entire probe system should be symmetrical since if this is not the case a nonsymmetrical $f_{K1}$ component exists which puts stringent requirements on the filter 56. In the preferred embodiment the response curves of the probes $P_1$ and $P_2$ follow approximately the conventional K/X function.

It is apparent from the above that the present invention provides an improved thickness gauge and particularly one which makes it possible to measure the thickness of very small parts for thicknesses down to accuracies of 0.000050 inch. The cost of performing this measurement is considerably reduced because fixturing requirements are relaxed by as much as 50 percent of standoff, because of the automatic self-centering feature of the probe. Continuous strip thickness gauging is possible and probe sizes can be changed for different nominal thicknesses. Long time thickness gauging stability is significantly increased using the gauge of this invention.

What is claimed and desired to be secured by United States Letters Patent is:

1. A gauge for measuring the thickness of a part comprising a of spaced sensing probes each probe providing an electrical output respectively representative of the distance from each probe to the part to be measured, each of said probes having identical response curves as a function of distance from the part under observation, drive means coupled to said probes for simultaneously vibrating said probes such that the probes move through identical vibratory paths toward and away from said part, means coupled to said probes and responsive to the outputs thereof to produce a measuring signal at double the frequency of probe vibration, and feedback means coupled to the outputs of said probes and said drive means for maintaining the average distance from the part to each probe substantially equal whereby the double frequency measuring signal is indicative of the thickness of the part.

2. A gauge according to claim 1 wherein said probes are formed integral with each other so that they move in unison.

3. A gauge according to claim 1 wherein said probes are noncontacting capacitive probes with equal surface areas facing each other.

4. A gauge according to claim 3 wherein said probes are formed by the ends of a substantially C-shaped conductive frame.

5. A gauge according to claim 1 wherein the response curves of said probes are nonlinear.

6. A gauge for measuring the thickness of a part comprising a pair of spaced sensing probes for sensing the distance from each probe to a part to be measured, said probes being mounted on a common support whereby they move simultaneously, a shaker coupled to said support for vibrating said probes toward and away from the part with a constant amplitude of vibration and a constant frequency, a transducer coupled to said probes for producing an electrical output signal in response to the vibration of said probes, said probes having identical response curves whereby said output signal is at double the frequency of probe vibration, and a feedback circuit between the output of said transducer and said shaker for moving said probes to maintain the average distance from the part to each probe substantially equal so that the double frequency output signal is indicative of the thickness of the part.

7. A gauge according to claim 6 wherein said feedback circuit includes a synchronous demodulator.

8. A gauge according to claim 6 including a band pass filter coupled to the output of said transducer, said filter rejecting signals at frequencies other than double the frequency of said vibrations.

9. A gauge according to claim 8 including a meter coupled to the output of said filter.

10. A gauge according to claim 6 wherein said transducer comprises a variable frequency oscillator having said probes connected in its frequency determining circuit, and an FM demodulator coupled to the output of said oscillator.

11. A gauge for measuring the thickness of a part comprising a generally C-shaped frame having a pair of opposed ends forming a pair of spaced capacitive probes, an electrically driven shaker, an insulating shaft mechanically connecting said shaker to said frame, means for supplying an alternating signal of constant frequency and constant amplitude to said shaker whereby said probes are vibrated along an axis joining said probes, a transducer, means connecting said probes in parallel to said transducer, said probes having identical response curves as a function of standoff distance from a part whereby said transducer develops an output signal at double the frequency of said vibrations, a synchronous demodulator coupled to said transducer, means for supplying said alternating signal of constant frequency and constant amplitude as a reference signal to said synchronous demodulator, and means coupling the output of said synchronous demodulator to said shaker whereby the center position of said shaker and probes is modified in accordance with the output of said synchronous demodulator.

12. A gauge according to claim 11 including a direct coupled amplifier between said synchronous demodulator and said shaker.

13. A gauge according to claim 11 wherein said means connecting said probes in parallel comprises a conductive stem connecting said insulating shaft to said conductive frame and a stationary conductive collar surrounding and spaced from said stem, said collar being electrically connected to said transducer.

14. A gauge according to claim 13 wherein said shaker vibrates said probes at a frequency of about 120 Hz. with a peak-to-peak amplitude of motion of about 0.001 inch.

15. A gauge according to claim 11 wherein said transducer comprises a variable frequency oscillator and a capacitive pickoff coupling said probes in parallel into the frequency determining circuit of said oscillator.

16. A gauge according to claim 15 including an FM demodulator coupled to the output of said oscillator, said FM demodulator feeding an error signal component at the frequency of vibration of said probes to the input of said synchronous demodulator.

17. A gauge according to claim 16 including a band pass filter coupled to the output of said FM demodulator, said filter rejecting signals at frequencies other than twice the frequency of vibration of said probes.

UNITED STATES PATENT OFFICE
CERTIFICATE OF CORRECTION

Patent No. 3,611,126                     Dated    October 5, 1971

Inventor(s)    Eugene R. Lucka

It is certified that error appears in the above-identified patent and that said Letters Patent are hereby corrected as shown below:

Column 2, line 22, "by" should read --but--; line 35, "may" should read --my--; line 53, "0.01 inch" should read --0.001 inch--.

Column 3, line 57, "as" should read --is--; line 63, "frequency" should read --a frequency--.

Column 4, line 12, "equal" should read --equal.--; line 43, "$P_T$" should read --$P_1$--; line 66, "again" should read --gain--.

Column 5, line 6, "$2f_1$" should read --$2f_{K1}$--; line 9, "and" should read --an--.

Column 5, line 44, Claim 1, "a of" should read --a pair of--.

Column 6, line 4, Claim 6, "and a" should read --and at a--.

Signed and sealed this 2nd day of May 1972.

(SEAL)
Attest:

EDWARD M. FLETCHER, JR.         ROBERT GOTTSCHALK
Attesting Officer              Commissioner of Patents